(12) United States Patent
Lin et al.

(10) Patent No.: US 10,826,072 B2
(45) Date of Patent: Nov. 3, 2020

(54) CURRENT COLLECTOR, ELECTRODE PLATE AND ELECTROCHEMICAL DEVICE

(71) Applicant: Contemporary Amperex Technology Co., Limited, Ningde, Fujian (CN)

(72) Inventors: Jinwei Lin, Ningde (CN); Zuyu Wu, Ningde (CN); Keqiang Li, Ningde (CN); Congmiao Wu, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 78 days.

(21) Appl. No.: 16/370,974

(22) Filed: Mar. 30, 2019

(65) Prior Publication Data

US 2020/0091520 A1    Mar. 19, 2020

(30) Foreign Application Priority Data

Sep. 17, 2018    (CN) .......................... 2018 1 1083345

(51) Int. Cl.
  *H01M 4/66*     (2006.01)
  *H01M 10/0525*  (2010.01)

(52) U.S. Cl.
  CPC ........... *H01M 4/668* (2013.01); *H01M 4/667* (2013.01); *H01M 10/0525* (2013.01)

(58) Field of Classification Search
  None
  See application file for complete search history.

(56) References Cited

U.S. PATENT DOCUMENTS

| | | |
|---|---|---|
| 2004/0126663 A1 | 7/2004 | Sudano et al. |
| 2012/0315537 A1 | 12/2012 | Ravdel et al. |
| 2018/0198132 A1 | 7/2018 | Liang et al. |

FOREIGN PATENT DOCUMENTS

| | | |
|---|---|---|
| CN | 106910897 A | 6/2017 |
| CN | 106981665 A | 7/2017 |
| CN | 107256809 A | 10/2017 |
| DE | 3844875 C2 | 9/1996 |
| EP | 3389122 A1 | 10/2018 |
| JP | 1996262208 A | 10/1996 |
| JP | 2003330120 A | 11/2003 |
| JP | 2004131728 A | 4/2004 |
| JP | 2006241446 A | 9/2006 |
| JP | 2007015108 A | 1/2007 |
| JP | 2007164154 A | 6/2007 |
| JP | 2017536427 A | 12/2017 |
| JP | 2018113242 A | 7/2018 |

OTHER PUBLICATIONS

The Official Action and search report dated Mar. 9, 2020 for Japanese application No. 2019-054247, 6 pages.
The extended European search report dated Sep. 3, 2019 for European application No. 19164862.5, 6 pages.
The Official Action and search report dated Jul. 21, 2020 for Chinese application No. 201811083345.2, 13 pages.

*Primary Examiner* — Wyatt P McConnell
(74) *Attorney, Agent, or Firm* — Law Offices of Liaoteng Wang

(57) ABSTRACT

The present application discloses a current collector, an electrode plate, and an electrochemical device. The current collector comprises: a support layer comprising opposite two surfaces along the thickness direction thereof; a conductive layer disposed on at least one of the two surfaces of the support layer; wherein the support layer comprises a support material selected from one or more of a polymer material and a polymer matrix composite material, and wherein the light transmittance T of the support layer is $0 \leq T \leq 98\%$. The current collector, electrode plate and electrochemical device provided by the present application have good processability.

12 Claims, No Drawings

CURRENT COLLECTOR, ELECTRODE PLATE AND ELECTROCHEMICAL DEVICE

CROSS-REFERENCE TO RELATED APPLICATION

This application is based on and claims priority to Chinese Patent Application No. 201811083345.2 filed on Sep. 17, 2018, which is incorporated herein by reference in its entirety.

TECHNICAL FIELD

The present application belongs to the field of energy storage technology, and in particular, relates to a current collector, an electrode plate and an electrochemical device.
BACKGROUND Lithium-ion secondary batteries are widely used in electric vehicles and various electronic products due to their high energy density, high output power, long cycle life and low environmental pollution, occupying the core position of power batteries.

The lithium-ion secondary battery collects and conducts current through the current collector during charge and discharge. After active and intensive research in recent years, the use of current collector containing the composite structure of a polymer layer and a metal layer instead of the traditional metal current collector can reduce the weight of the battery and increase the energy density of the battery.

However, the processability of the current collector containing the composite structure of a polymer layer and a metal layer is poor. For example, for an electrode plate and a lithium-ion secondary battery using the composite structure of a polymer layer and a metal layer, sticking of cutting tools is easy to occur when cut by a conventional knife-die molding process in a tab forming process, resulting in the decrease of the lifetime of the knife-die. When cut by laser molding process, if a low-power laser is used, the bonding is easy to occur and the cutting efficiency is low, while increasing the laser power will cause a bad phenomenon such as the burning of the metal layer and the melting of the polymer layer.

Therefore, it is necessary to provide a design to improve the processability of the current collector, the electrode plate, and the electrochemical device.

SUMMARY

The purpose of the present application is to provide a current collector, an electrode plate and an electrochemical device having good processability.

A first aspect of the present application provides a current collector comprising: a support layer comprising opposite two surfaces along the thickness direction thereof; and a conductive layer disposed on at least one of two surfaces of the support layer; wherein the support layer comprises a support material selected from one or more of a polymer material and a polymer matrix composite material, and wherein the light transmittance T of the support layer satisfies: $0 \leq T \leq 98\%$.

A second aspect of the present application provides an electrode plate comprising a current collector and an active material layer disposed on the current collector, wherein the current collector is the current collector provided by the first aspect of the application.

A third aspect of the present invention provides an electrochemical device comprising a positive electrode plate, a negative electrode plate, a separator, and an electrolyte, wherein the positive electrode plate and/or the negative electrode plate are the electrode plate provided by the second aspect of the present application.

Compared with the prior art, the present application has at least the following beneficial effects:

Due to that the support layer comprises one or more of a polymer material and a polymer matrix composite material and that the light transmittance T of the support layer satisfies $0 \leq T \leq 98\%$, the current collector provided by the present application can realize that, during laser cutting process the current collector, the electrode plate and the electrochemical device using the current collector have high processability and processing efficiency.

DETAILED DESCRIPTION

In order to make the objects, technical solutions, and advantageous technical effects of the present application more clear, the present application will be further described in detail below with reference to the embodiments. It is to be understood that the embodiments described herein are merely illustrative of the invention and are not intended to limit the invention.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the context herein, unless otherwise indicated, "above" and "below" are inclusive of the number itself, and "more" in the expression "one or more" means two or more.

The above summary of the present application is not intended to describe each disclosed embodiment or every implementation. The following description more particularly exemplifies the exemplary embodiments. In many places throughout the application, guidance is provided through a series of embodiments that can be used in various combinations. In each instance, the list is merely representative and should not be construed as exhaustive.

Current Collector

A first aspect of embodiments of the present application provides a current collector comprising a support layer and a conductive layer disposed in stack. Specifically, there are opposite two surfaces in the thickness direction of the support layer itself, and the conductive layer is disposed on either or both of the two surfaces of the support layer to function as conducting electricity and collecting current.

The support layer comprises a support material, and the support material may be one or more of a polymer material and a polymer matrix composite material.

Further, the light transmittance T of the support layer satisfies: $0 \leq T \leq 98\%$.

In the current collector provided by the present application, the support layer has appropriate rigidity, can satisfy the support and protection of the conductive layer, ensure the overall strength of the current collector, and has appropriate flexibility to enable the current collector and the electrode plate to be winded during the processing. As the density of the support layer is lower than that of the conductive layer, the current collector of the present application is significantly lighter than the conventional current collector. Therefore, with the current collector of the present application, the weight energy density of the electrochemical device can be significantly improved.

Moreover, compared with the conventional metal current collector, due to that the conductive layer of the current collector provided by the present application has a small thickness, the metal burr generated by the abnormal situation of being pierced by a sharp object (such as nail penetration, etc.) is smaller, and at the same time the support layer is capable of isolating the metal burrs, thereby effectively improving the safety performance of the electrochemical device employing the current collector of the present application.

In addition, the current collector provided by the present application has a high absorption rate for laser energy, thereby realizing that the current collector, the electrode plate and the electrochemical device using the current collector have a higher processability and processing efficiency in the laser cutting process. In particular, it has high processability and processing efficiency in the low-power laser cutting process. In such case the laser power in the laser cutting process is, for example, 100 W or less.

Preferably, the light transmittance T of the support layer satisfies $0 \leq T \leq 95\%$, which better improves the processability and processing efficiency of the current collector, the electrode plate and the electrochemical device using the current collector in the laser cutting process. In particular, the processability and processing efficiency during low-power laser cutting process are improved. More preferably, the light transmittance T of the support layer satisfies $15\% \leq T \leq 90\%$.

The above polymer material is, for example, one or more of a polyamide-based polymer, a polyimide-based polymer, a polyester-based polymer, a polyolefin-based polymer, a polyalkyne-based polymer, a siloxane polymer, polyether, polyalcohol, polysulfone, polysaccharide polymer, amino acid polymer, polysulfur nitride, aromatic cyclic polymer, aromatic heterocyclic polymer, polyphenylene sulfide, polysulfone, epoxy resin, phenolic resin, the derivatives thereof, the crosslinked products thereof, and the copolymers thereof.

As an example, the polyamide-based polymer may be one or more of polyamide (Polyamide, abbreviated as PA, commonly known as nylon) and poly(p-phenylene terephthalamide) (PPTA, commonly known as aramid); the polyimide-based polymer may be polyimide (PI); the polyester-based polymer may be one or more of polyethylene terephthalate (PET), polybutylene terephthalate (PBT), polyethylene naphthalene (PEN) and polycarbonate (PC); the polyolefin-based polymer may be one or more of polyethylene (PE), polypropylene (PP) and ethylene-propylene rubber (EPR); the derivative of the polyolefin-based polymer may be one or more of polyvinyl alcohol (PVA), polystyrene (PS), polyvinyl chloride (PVC), polyvinylidene fluoride (PVDF), polytetrafluoroethylene (PTFE) and poly(sodium-styrene-sulfonate) (PSS); the polyalkyne-based polymer may be polyacetylene (PA); the siloxane polymer may be silicone rubber; the ether may be, for example, one or more of polyoxymethylene (POM), polyphenylene oxide (PPO), and polyphenylene sulfide (PPS); the polyalcohol may be polyethylene glycol (PEG); the polysaccharide polymer may be, for example, one or more of cellulose and starch; the amino acid polymer may be a protein; the aromatic cyclic polymer may be polyphenylene such as polyparaphenylene; the aromatic heterocyclic polymer may be one or more of polypyrrole (PPy), polyaniline (PAN), polythiophene (PT), and polypyridine (PPY); the copolymer of the polyolefin-based polymer and its derivative may be an acrylonitrile-butadiene-styrene copolymer (ABS).

Further, the above polymer material may be doped by means of redox, ionization or electrochemistry.

The polymer matrix composite material may be a composite of the above polymer material and an additive, wherein the additive may be one or more of a metal material and an inorganic non-metal material.

As an example, the metal material may be one or more of aluminum, aluminum alloy, copper, copper alloy, nickel, nickel alloy, titanium, titanium alloy, iron, iron alloy, silver, and silver alloy; the inorganic non-metal material may be one or more of a carbon-based material, alumina, silica, silicon nitride, silicon carbide, boron nitride, silicate, and titanium oxide, such as one or more of a glass material, a ceramic material, and a ceramic composite material. The aforementioned carbon-based material may be one or more of graphite, superconducting carbon, acetylene black, carbon black, ketjen black, carbon dots, carbon nanotubes, graphene, and carbon nanofibers.

The above additive may be a carbon-based material coated with a metal material, such as one or more of nickel-coated graphite powder and nickel-coated carbon fiber.

In some preferred embodiments, the support layer comprises one or more of polyethylene terephthalate (PET), polybutylene terephthalate (PBT), polyethylene naphthalate (PEN), and polyimide (PI).

It can be understood that the support layer may be a single-layer structure, or may be a multi-layer composite structure formed by two or more sub-support layers, such as two layers, three layers, four layers, and the like. When the support layer is a multi-layer composite structure formed by two or more sub-support layers, the materials of the layers may be the same or different.

In the current collector provided in the examples of the present application, the support layer contains a colorant. The light transmittance of the support layer can be adjusted by adding a colorant to the support material and controlling the content of the colorant.

The colorant may cause the support layer to exhibit a certain degree of black, blue or red color, but is not limited thereto, and may be, for example, a certain degree of yellow, green or purple color.

The colorant may be one or more of an inorganic pigment and an organic pigment.

The inorganic pigment is, for example, one or more of carbon black, cobalt blue, ultramarine blue, iron oxide, cadmium red, chrome orange, molybdenum orange, cadmium yellow, chrome yellow, nickel titanium yellow, titanium white, lithopone, and zinc white.

The organic pigment may be one or more of phthalocyanine pigment, azo pigment, anthraquinone pigment, indigoid pigment, and metal complex pigment. As an example, the organic pigment may be one or more of plastic red GR, plastic violet RL, light fast yellow G, permanent yellow, Rubber Scarlet LC, phthalocyanine blue, and phthalocyanine green.

In the current collector provided by the embodiment of the present application, the thickness D1 of the support layer is preferably $1 \ \mu m \leq D1 \leq 30 \ \mu m$, which is beneficial to improve the processability and processing efficiency of the current collector in the laser cutting process, in particular, to improve the processability and processing efficiency of the current collector in the low-power laser cutting process. At the same time, the mechanical strength of the support layer is ensured, and the support layer is prevented from being broken during the processing of the current collector, the electrode plate and the electrochemical device, ensuring that the electrochemical device has a high weight energy density.

The upper limit of the thickness D1 of the support layer may be 30 µm, 25 µm, 20 µm, 15 µm, 12 µm, 10 µm, 8 µm, and the lower limit may be 1 µm, 1.5 µm, 2 µm, 3 µm, 4 µm, 5 µm, 6 µm, 7 µm; the range of thickness D1 of the support layer can be composed of any upper limit and any lower limit. Preferably, the thickness D1 of the support layer is 1 µm D1≤20 µm; further preferably 2 µm≤D1≤15 µm; more preferably 3 µm≤D1≤12 µm.

Preferably, the thickness D1 of the support layer and the light transmittance T of the support layer satisfy:

When 12 µm D1≤30 µm, 30%≤T≤80%; and/or,
When 8 µm≤D1<12 µm, 40%≤T≤90%; and/or,
When 1 µm≤D1<8 µm, 50%≤T≤98%.

The thickness and light transmittance of the support layer satisfy the above relationship, so that when the laser irradiates the support layer, the support layer can absorb the laser energy as much as possible, so that the current collector has high processability and processing efficiency in the laser cutting process, in particular, the current collector has high processability and processing efficiency in the low-power laser cutting process, avoiding the occurrence of bonding. When the thickness and light transmittance of the support layer satisfy the above relationship, it is also advantageous that the support layer has suitable mechanical strength to prevent the support layer from being broken during the processing of the current collector, the electrode plate and the electrochemical device.

Preferably, the tensile strength of the support layer in the MD direction (mechanical direction) is 100 MPa or more, and more preferably 100 MPa to 400 MPa.

The tensile strength of the support layer in the MD direction can be tested using equipment and methods known in the art, for example according to the DIN 53455-6-5 measurement standard, using a tensile strength tester, preferably using a Japanese ALGOL tensile test head, to test the maximum tensile stress at break in the MD direction of the support layer, the ratio of the maximum tensile stress at break to the cross-sectional area of the support layer is the tensile strength of the support layer in the MD direction.

The support layer may have the above tensile strength by adjusting the chemical composition, molecular weight and distribution, chain structure, chain construction, aggregate structure, phase structure, and the like of the polymer material.

In the current collector provided by the embodiment of the present application, the conductive material of the conductive layer may be one or more of a metal material, a carbon-based conductive material, and a conductive polymer material.

As an example, the metal material may be one or more of aluminum, aluminum alloy, copper, copper alloy, nickel, nickel alloy, iron, iron alloy, titanium, titanium alloy, silver, and silver alloy, preferably one or more of aluminum, copper, nickel, iron, titanium, silver, nickel copper alloy and aluminum zirconium alloy.

When the conductive layer is made of a metal material, it may be formed on the support layer by at least one of mechanical rolling, bonding, vapor deposition, and electroless plating, wherein the vapor deposition is preferably Physical Vapor Deposition (PVD); the physical vapor deposition is preferably at least one of evaporation method and sputtering method; the evaporation method is preferably at least one of vacuum evaporating, thermal evaporation deposition and electron beam evaporation method (EBEM), and the sputtering method is preferably magnetron sputtering.

Preferably, the conductive layer of the metal material may be formed on the support layer by at least one of a vapor deposition method and an electroless plating to make the binding between the support layer and the conductive layer stronger.

As an example, the conditions for forming a conductive layer by mechanical rolling as described above are as follows: a metal foil is placed in a mechanical roll, which is pressed to a predetermined thickness by applying a pressure of 20 t to 40 t, and then is placed on a surface of the support layer which is subjected to surface cleaning treatment, then the two materials are placed in a mechanical roller and are tightly bonded by applying a pressure of 30 t to 50 t.

As another example, the conditions for forming a conductive layer by bonding as described above are as follows: a metal foil is placed in a mechanical roll, which is pressed to a predetermined thickness by applying a pressure of 20 t to 40 t; and then the surface of the support layer which is subject to a surface cleaning treatment is coated with a mixed solution of polyvinylidene fluoride (PVDF) and N-methylpyrrolidone (NMP); finally, the conductive layer having the above-mentioned predetermined thickness is bonded to the surface of the support layer, and dried at 100° C.

As still another example, the conditions for forming the conductive layer by the vacuum evaporation method as described above are as follows: the support layer which is subjected to a surface cleaning treatment is placed in a vacuum plating chamber, and the high-purity wire in the metal evaporation chamber is melted and evaporated at a high temperature of 1300° C. to 2000° C. The evaporated metal passes through a cooling system in the vacuum plating chamber and is finally deposited on the surface of the support layer to form a conductive layer.

The above carbon-based conductive material is, for example, one or more of graphite, superconducting carbon, acetylene black, carbon black, ketjen black, carbon dots, carbon nanotubes, graphene, and carbon nanofibers.

When the conductive layer is made of a carbon-based conductive material, it may be formed on the support layer by at least one of mechanical rolling, bonding, vapor deposition, in-situ formation, and coating.

The conductive polymer material is, for example, one or more of polysulfur nitride, aliphatic conjugated polymer, aromatic ring conjugated polymer, and aromatic heterocyclic conjugated polymer. The aliphatic conjugated polymer is, for example, polyacetylene; the aromatic ring conjugated polymer is, for example, one or more of polyphenylene such as polyparaphenylene, and polynaphthalene; and the aromatic heterocyclic conjugated polymer is, for example, one or more of polypyrrole, polyaniline, polythiophene, and polypyridine. It is also possible to increase the electron delocalization by doping, to increase the conductivity, and further improve the rate performance of the electrochemical device.

When the conductive layer is made of a conductive polymer material, it may be formed on the support layer by at least one of mechanical rolling, bonding, in-situ formation, and coating.

The conductive layer is preferably made of a metal material such as a metal foil, a carbon coated metal foil or a porous metal plate.

The arrangement of the support layer enables the thickness of the conductive layer in the current collector of the present application to be significantly lower than that of the conventional metal current collector, and the thickness D2 of the conductive layer is preferably 30 nm≤D2≤3 μm. The thickness of the conductive layer is reduced, thus the weight of the current collector, the electrode plate and the electrochemical device can be reduced, and the weight energy density of the electrochemical device can be increased. In addition, due to that the thickness of the conductive layer is lowered, in an abnormal situation such as the battery is pierced by a sharp object, the current collector produces smaller metal burrs to better improve the safety performance of the electrochemical device. Using a conductive layer with a thickness of 30 nm≤D2≤3 μm, the current collector has good properties of conducting electricity and collecting current, which is beneficial to reduce the internal resistance of the battery and to reduce the polarization phenomenon, thereby improving the rate performance and cycle performance of the electrochemical device.

The upper limit of the thickness D2 of the conductive layer may be 3 μm, 2.5 μm, 2 μm, 1.8 μm, 1.5 μm, 1.2 μm, 1 μm, 900 nm, and the lower limit of the thickness D2 of the conductive layer may be 800 nm, 700 nm, 600 nm, 500 nm, 450 nm, 400 nm, 350 nm, 300 nm, 100 nm, 50 nm, 30 nm; and the range the thickness D2 of the conductive layer can be composed of any upper limit and any lower limit. Preferably, the thickness D2 of the conductive layer is 300 nm≤D2≤2 μm.

As an example, a conductive layer is provided on both surfaces in the thickness direction of the support layer itself, and the thicknesses are D21 and D22, respectively, wherein 30 nm≤D21≤3 μm, preferably 300 nm≤D21≤2 μm; 30 nm≤D22≤3 μm It is preferably 300 nm23 D22≤2 μm.

As another example, a conductive layer is provided only on one of the two surfaces in the thickness direction of the support layer itself, and has a thickness of D23, wherein 30 nm≤D23≤3 μm, preferably 300 nm≤D23≤2 μm.

The current collector of the present application can be used as either or both of a positive electrode current collector and a negative electrode current collector.

When the current collector of the present application is used as a positive electrode current collector, the conductive layer of the current collector may be a metal foil, a carbon coated metal foil or a porous metal plate such as an aluminum foil.

When the current collector of the present application is used as a negative electrode current collector, the conductive layer of the current collector may be a metal foil, a carbon coated metal foil or a porous metal plate such as a copper foil.

Electrode Plate

A second aspect of the embodiments of the present application provides an electrode plate comprising stacked current collector and active material layer, wherein the current collector is the current collector provided by the first aspect of the embodiments of the present application.

Since the electrode plate uses the current collector according to the first aspect of the embodiments of the present application, it has good processing performance, high processability and processing efficiency in the laser cutting process, in particular, has high processability and processing efficiency in the low-power laser cutting process. In addition, the safety performance and energy density of the electrode plate are significantly improved.

The electrode plate of the present application can be used as either or both of a positive electrode plate and a negative electrode plate.

When the electrode plate of the present application is used as a positive electrode plate, the active material layer may employ a positive active material known in the art which is possible to reversibly perform ion intercalation/deintercalation.

Taking a lithium-ion secondary battery as an example, the positive active material is a compound capable of reversibly performing lithium ion intercalation/deintercalation, such as a lithium-containing transition metal oxide, wherein the transition metal may be one or more of Mn, Fe, Ni, Co, Cr, Ti. Zn, V, Al, Zr, Ce, and Mg. As an example, the lithium-containing transition metal oxide may be one or more of $LiMn_2O_4$, $LiNiO_2$, $LiCoO_2$, $LiNi_{i-y}Co_yO2$ ($0<y<1$), $LiNi_aCo_bAl_{1-a-b}O_2$ ($0<a<1$, $0<b<1$, $0<a+b<1$), $LiMn_{i-m-n}Ni_mCo_nO_2$ ($0<m<1$, $0<n<1$, $0<m+n<1$), $LiMPO_4$ (M may be one or more of Fe, Mn, Co) and $Li_3V_2(PO_4)_3$. The lithium-containing transition metal oxide can also be doped or surface-coated to make the compound have a more stable structure and superior electrochemical performance.

The active material layer of the positive electrode plate may further comprise a binder and a conductive agent. The binder and the conductive agent are not specifically limited in the present application, and may be selected according to actual needs.

As an example, the binder may be one or more of styrene butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA), and polyvinyl alcohol (PVA).

As an example, the conductive agent may be one or more of graphite, superconducting carbon, acetylene black, carbon black, ketjen black, carbon dots, carbon nanotubes, graphene, and carbon nanofibers.

The positive electrode plate can be prepared according to a conventional method in the art. The positive active material and the optional conductive agent and binder are usually dispersed in a solvent (for example, N-methylpyrrolidone, abbreviated as NMP) to form a uniform positive electrode slurry, and the positive electrode slurry is coated on the positive electrode current collector. After the steps of drying and cold pressing, a positive electrode plate is obtained.

When the electrode plate of the present application is used as a negative electrode plate, the active material layer may employ a negative active material known in the art which is possible to reversibly perform ion intercalation/deintercalation.

Also taking a lithium-ion secondary battery as an example, the negative active material is a substance capable of reversibly performing lithium ion intercalation/deintercalation, such as one or more of metallic lithium, natural graphite, artificial graphite, mesophase microcarbon (abbreviated as MCMB), hard carbon, soft carbon, silicon, silicon-carbon composite, SiO, Li—Sn alloy, Li—Sn—O alloy, Sn, SnO, $SnO_2$, spinel structure lithium titanate $Li_4Ti_5O_{12}$ and Li—Al alloy.

The active material layer of the negative electrode plate may further comprise a binder and a conductive agent. The binder and the conductive agent are not specifically limited in the present application, and may be selected according to actual needs.

As an example, the binder may be one or more of styrene butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA), and polyvinyl alcohol (PVA).

As an example, the conductive agent may be one or more of graphite, superconducting carbon, acetylene black, carbon black, ketjen black, carbon dots, carbon nanotubes, graphene, and carbon nanofibers.

A thickener such as carboxymethyl cellulose (CMC) may also be comprised in the negative electrode plate.

The negative electrode plate can be prepared according to a conventional method in the art. The negative active material and optional conductive agent, binder and thickener are usually dispersed in a solvent (wherein the solvent may be deionized water or NMP) to form a uniform negative electrode slurry, and the negative electrode slurry is coated on the negative electrode current collector. After drying, cold pressing and other processes, the negative electrode plate is obtained.

Electrochemical Device

A third aspect of the embodiments of the present application provides an electrochemical device comprising the electrode plate provided by the second aspect of the embodiments of the present application.

Since the electrochemical device uses the electrode plate according to the second aspect of the embodiments of the present application, it has good processing performance, has high processability and processing efficiency in the laser cutting process, in particular, has high processability and processing efficiency in the low-power laser cutting process; and the electrochemical device has high safety performance, high energy density and low weight.

The electrochemical device comprises a positive electrode plate, a negative electrode plate, a separator, and an electrolyte, wherein one or both of the positive electrode plate and the negative electrode plate are the electrode plate provided in the second aspect of the embodiments of the present application.

The electrochemical device may be a lithium-ion secondary battery, a lithium primary battery, a sodium-ion battery, a magnesium-ion battery, or the like, but is not limited thereto.

The separator is not particularly limited, and any well-known porous structural separator having electrochemical stability and chemical stability may be selected, and may be, for example, one or more of single-layer or multi-layer films of glass fiber, non-woven fabric, polyethylene, polypropylene, and polyvinylidene fluoride.

The electrolyte comprises an organic solvent and an electrolytic salt, wherein the electrolytic salt functions to transport ions between positive and negative electrodes, and the organic solvent serves as a medium for transporting ions. The electrolytic salt may be an electrolytic salt known in the art for an electrolyte of an electrochemical device, and the organic solvent may be an organic solvent known in the art for an electrolyte of an electrochemical device, and a suitable electrolytic salt and organic solvent may be selected according to actual needs.

The positive electrode plate, the separator and the negative electrode plate are stacked in order, so that the separator plays the role of isolation between the positive electrode plate and the negative electrode plate, and thus the battery core is obtained, or the battery core can be obtained after winding. An electrochemical device was prepared by placing the core in a package, injecting an electrolyte and sealing.

An electrochemical device will be exemplarily described using a lithium-ion secondary battery as an example.

In the above electrolyte, the organic solvent may be an organic solvent known in the art for the electrolyte of a lithium-ion secondary battery, such as one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluorinated ethylene carbonate (FEC), methyl formate (MF), methyl acetate (MA), ethyl acetate (EA), propyl acetate (PA), methyl propionate (MP), ethyl propionate (EP) , propyl propionate (PP), methyl butyrate (MB), ethyl butyrate (EB), 1,4-butyrolactone (GBL), cyclobutyl sulfone (SF), dimethyl sulfone (MSM), methyl ethyl sulfone (EMS) and diethyl sulfone (ESE), preferably two or more.

In the above electrolyte, the electrolytic lithium salt may be an electrolytic lithium salt known in the art for the electrolyte of a lithium-ion secondary battery, such as one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethylsulfonyl)imide), LiTFS (lithium trifluoromethanesulfonate), LiDFOB (lithium difluoro(oxalato)borate), LiBOB (lithium bis(oxalato)borate), $LiPO_2F_2$ (lithium difluorophosphate), LiDFOP (lithium difluorobis(oxalato)phosphate), and LiTFOP (lithium tetrafluorooxalatophosphate).

EXAMPLE

The following examples are intended to describe the disclosure of the present invention, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Preparation of Support Layer

The support material was PET, and a certain amount of colorant carbon black was added to the PET, and then the mixture was uniformly mixed. After the PET was hot-melted, the support layer was obtained by extrusion casting, cold rolling, and biaxial stretching.

Preparation of Current Collector

The support layer was placed in a vacuum plating chamber, and the high-purity aluminum wire in the metal evaporation chamber was melted and evaporated at a high temperature of 1300° C. to 2000° C. The evaporated metal was passed through a cooling system in the vacuum plating chamber and finally deposited on both surfaces of the support layer. The conductive layers were formed, and the thickness D2 of the conductive layers on both surfaces was equal.

Example 2~10

Different from Example 1, the relevant parameters in the preparation process were adjusted, and the specific parameters were shown in Table 1 below.

Comparative Example 1

Different from Example 4, no colorant was added to the support layer.

Test Section (1) Test of light transmittance of the support layer:

Use LS117 light transmittance meter to test the light transmittance of the support layer according to GB2410-80 standard, including: firstly, the instrument was self-calibrated, the interface displayed T=100%, i.e. the calibration was OK, then the support layer sample was clamped between the probe and the receiver, then the interface automatically displayed the light transmittance value of the support layer.

(2) Tensile strength test of the support layer in the MD direction:

The tensile strength of the support layer in the MD direction was tested using a tensile strength tester in accordance with DIN 53455-6-5. The Japanese ALGOL tensile test head (1 kg) was used, and the support layer sample was installed between the two test heads to test the maximum tensile stress when the support layer was broken in the MD direction. The ratio of the maximum tensile stress when the support layer was broken in the MD direction to the cross-sectional area of the support layer sample was the tensile strength of the support layer in the MD direction.

(3) Test for cutting performance of current collector:

Fiber laser from IPG Company (Model: YLP-V2-1-100-100-100) was used, wherein the power was set to 100 W, and the frequency was 150 kHz. The current collector was installed on the laser cutting device for cutting to test the maximum cut-off speed of the current collector. The maximum cut-off speed of the current collector referred to the maximum cutting speed that could be achieved by laser cutting the current collector without the glue phenomenon.

The test results of Examples 1 to 10 and Comparative Example 1 were shown in Table 1 below.

As can be seen from the comparison of Examples 4-5 and Comparative Example 1, by reducing the light transmittance of the support layer, the cutting speed of the current collector in the low-power laser cutting process without the occurrence of the glue phenomenon was significantly increased.

As can be seen from the test results of the Examples 1 to 10, the present application improved the cutting performance and the cutting speed of the current collector in the laser cutting process by reducing the light transmittance of the support layer, in particular, the cutting performance and the cutting rate of the current collector in the low-power laser cutting process were significantly improved.

The above is only the specific embodiment of the present application, but the scope of the present application is not limited thereto. Various equivalent modifications and variations of the present application that can be easily conceived by those skilled in the art are intended to be included within the scope of the present application. Therefore, the scope of the invention should be determined by the scope of the claims.

The invention claimed is:

1. A current collector, comprising:
   a support layer comprising opposite two surfaces along the thickness direction thereof;
   a conductive layer disposed on at least one of the two surfaces of the support layer;
   wherein the support layer comprises a support material selected from one or more of a polymer material and a polymer matrix composite material, and the light transmittance T of the support layer satisfies: $0 \leq T \leq 98\%$;
   wherein the support layer contains a colorant selected from one or more of carbon black, cobalt blue, ultramarine blue, iron oxide, cadmium red, chromium orange, molybdenum orange, cadmium yellow, chrome yellow, nickel titanium yellow, titanium white, lithopone, zinc white, phthalocyanine pigment, azo pigment, anthraquinone pigment, indigoid pigment, and metal complex pigment; and
   wherein the support layer has a thickness D1 of $1 \mu m \leq D1 \leq 30 \mu m$.

TABLE 1

| | Conductive layer | | Support layer | | | | | |
|---|---|---|---|---|---|---|---|---|
| | material | $D_2$ μm | material | $D_1$ μm | colorant | light transmittance % | Tensile strength Mpa | The maximum cut-off speed m/min |
| Example 1 | Al | 0.03 | PET | 1 | Carbon black | 98 | 50 | 30 |
| Example 2 | Al | 0.3 | PET | 6 | Carbon black | 92 | 149 | 36 |
| Example 3 | Al | 1 | PET | 6 | Carbon black | 87 | 137 | 50 |
| Example 4 | Al | 1 | PET | 10 | Carbon black | 96 | 237 | 20 |
| Example 5 | Al | 1 | PET | 10 | Cadmium red | 55 | 185 | 80 |
| Example 6 | Al | 1.5 | PET | 15 | Cobalt blue | 80 | 298 | 30 |
| Example 7 | Al | 2 | PET | 15 | Carbon black | 54 | 246 | 60 |
| Example 8 | Al | 2 | PET | 20 | Carbon black | 45 | 300 | 55 |
| Example 9 | Al | 3 | PET | 30 | Carbon black | 40 | 323 | 50 |
| Example 10 | Al | 0.03 | PET | 30 | Carbon black | 40 | 323 | 55 |
| Comparative Example 1 | Al | 1 | PET | 10 | / | 100 | 247 | 15 |

2. The current collector according to claim 1, wherein the light transmittance T of the support layer satisfies: $0 \leq T \leq 95\%$.

3. The current collector according to claim 1, wherein the light transmittance T of the support layer satisfies: $15\% \leq T \leq 90\%$.

4. The current collector according to claim 1, wherein the tensile strength of the support layer in the mechanical direction MD is at least 100 MPa.

5. The current collector according to claim 1, wherein the support layer has a thickness D1 of $1\ \mu m \leq D1 \leq 20\ \mu m$;
the tensile strength of the support layer in the mechanical direction MD is at least 100 MPa.

6. The current collector according to claim 5, wherein the thickness D1 of the support layer and the light transmittance T of the support layer satisfy:
when $12\ \mu m \leq D1 \leq 30\ \mu m$, $30\% \leq T \leq 80\%$; and/or,
when $8\ \mu m \leq D1 < 12\ \mu m$, $40\% \leq T \leq 90\%$; and/or,
when $1\ \mu m \leq D1 < 8\ \mu m$, $50\% \leq T \leq 98\%$.

7. The current collector according to claim 1, wherein the conductive layer has a thickness D2 of $30\ nm \leq D2 \leq 3\ \mu m$.

8. The current collector according to claim 1, wherein the conductive layer has a thickness D2 of $300\ nm \leq D2 \leq 2\ \mu m$.

9. The current collector according to claim 1, wherein the polymer material is selected from one or more of polyamide, poly(p-phenylene terephthalamide), polyimide, polyethylene terephthalate, polybutylene terephthalate, polyethylene naphthalate, polycarbonate, polyethylene, polypropylene, ethylene-propylene rubber, acrylonitrile-butadiene-styrene copolymer, polyvinyl alcohol, polystyrene, polyvinyl chloride, polyvinylidene fluoride, polytetrafluoroethylene, poly(sodium-styrenesulfonate), polyacetylene, silicone rubber, polyoxymethylene, polyphenylene oxide, polyphenylene sulfide, polyethylene glycol, polysulfur nitride, polyphenylene such as polyparaphenylene, polypyrrole, polyaniline, polythiophene, polypyridine, cellulose, starch, protein, epoxy resin, phenolic resin, the derivatives thereof, the crosslinked products thereof and the copolymers thereof; and/or,
wherein the polymer matrix composite material comprises the polymer material and an additive, and wherein the additive comprises one or more of a metal material and an inorganic non-metal material.

10. The current collector according to claim 1, wherein the conductive layer comprises one or more of a metal material, a carbon-based conductive material, and a conductive polymer material; and
wherein the metal material is one or more of aluminum, copper, nickel, titanium, silver, nickel-copper alloy, and aluminum-zirconium alloy; and
wherein the carbon-based conductive material is one or more of graphite, superconducting carbon, acetylene black, carbon black, ketjen black, carbon dots, carbon nanotubes, graphene, and carbon nanofibers; and
wherein the conductive polymer material is one or more of polysulfur nitride, aliphatic conjugated polymer, aromatic ring conjugated polymer, and aromatic heterocyclic conjugated polymer.

11. An electrode plate comprising:
a current collector according to claim 1; and
an active material layer disposed on the current collector.

12. An electrochemical device comprising a positive electrode plate, a negative electrode plate, a separator, and an electrolyte, wherein the positive electrode plate and/or the negative electrode plate is the electrode plate according to claim 11.

* * * * *